US011801586B2

(12) United States Patent
Lothschutz et al.

(10) Patent No.: US 11,801,586 B2
(45) Date of Patent: Oct. 31, 2023

(54) LASER PART RETENTION SYSTEM AND METHOD

(71) Applicant: Extol Inc., Zeeland, MI (US)

(72) Inventors: Benjamin Lothschutz, Marne, MI (US); Nicholas Memmelaar, Hudsonville, MI (US); Nicholas Flesher, Jenison, MI (US)

(73) Assignee: Extol Inc., Zeeland, MI (US)

( * ) Notice: Subject to any disclaimer, the term of this patent is extended or adjusted under 35 U.S.C. 154(b) by 0 days.

(21) Appl. No.: 17/915,255

(22) PCT Filed: Mar. 2, 2022

(86) PCT No.: PCT/US2022/018570
§ 371 (c)(1),
(2) Date: Sep. 28, 2022

(87) PCT Pub. No.: WO2022/187398
PCT Pub. Date: Sep. 9, 2022

(65) Prior Publication Data
US 2023/0118219 A1 Apr. 20, 2023

Related U.S. Application Data

(60) Provisional application No. 63/155,523, filed on Mar. 2, 2021.

(51) Int. Cl.
B25B 11/00 (2006.01)
B23K 26/21 (2014.01)
(Continued)

(52) U.S. Cl.
CPC ............ B25B 11/005 (2013.01); B23K 26/02 (2013.01); B23K 26/21 (2015.10); B29C 65/16 (2013.01); B29C 65/78 (2013.01)

(58) Field of Classification Search
CPC ....... B25B 11/005; B23K 26/02; B29C 65/78; B29C 65/16
See application file for complete search history.

(56) References Cited

U.S. PATENT DOCUMENTS 6,841,034 B2  1/2005  Zuehlke et al.
8,357,875 B2  1/2013  Ehrmann et al.
(Continued)

FOREIGN PATENT DOCUMENTS

WO  2018/211176 A1  11/2018

OTHER PUBLICATIONS

International Search Report and Written Opinion in PCT/US2022/018570, dated May 18, 2022, 14 pgs.

Primary Examiner — Daniel McNally
(74) Attorney, Agent, or Firm — Young Basile Hanlon & MacFarlane, P.C.

(57) ABSTRACT

A system for laser processing includes a plate assembly having a first plate, a second plate secured to the first plate, and a pressure chamber located between the plates, a connector extending into and in fluid communication with the pressure chamber, and a fixture having a first end attached to the second plate of the plate assembly, a second end having surface having at least one opening and shaped to fit a part to be retained and laser processed, and a conduit extending therethrough in fluid communication with the pressure chamber and the at least one opening. During use, a pressure generated by a pump may be communicated to the conduit of the fixture through the pressure chamber to provide pressure (e.g., a suction effect) at the opening(s) to secure the part in place, e.g., with respect to another part, so they can be laser processed.

14 Claims, 12 Drawing Sheets

(51) Int. Cl.
*B23K 26/02* (2014.01)
*B29C 65/16* (2006.01)
*B29C 65/78* (2006.01)

(56) References Cited

U.S. PATENT DOCUMENTS

| | | | |
|---|---|---|---|
| 2003/0094240 A1* | 5/2003 | Sarmiento | B29C 66/1222 |
| | | | 156/380.9 |
| 2005/0051277 A1* | 3/2005 | Phillips | H10K 71/18 |
| | | | 156/230 |
| 2005/0275999 A1 | 12/2005 | Chiang et al. | |
| 2006/0284357 A1 | 12/2006 | Goko et al. | |
| 2009/0179365 A1 | 7/2009 | Lerner et al. | |
| 2014/0001163 A1* | 1/2014 | Tanaka | H01L 24/75 |
| | | | 219/121.63 |
| 2017/0282308 A1 | 10/2017 | Tymosch | |

* cited by examiner

LASER PART RETENTION SYSTEM AND METHOD

CROSS-REFERENCE TO RELATED APPLICATION(S)

This application claims priority to and the benefit of U.S. Provisional Application Patent Ser. No. 63/155,523, filed Mar. 2, 2021, the entire disclosure of which is hereby incorporated by reference.

TECHNICAL FIELD

This disclosure relates generally to retaining or securing a part for laser processing, particularly for laser welding.

BACKGROUND

When laser processing a part, a laser beam should travel from a laser source to a part without interference. This is straightforward for processing many parts but avoiding interference can be complicated where the processing involves a laser beam that traverses the surface of a part, such as in laser welding.

SUMMARY

Disclosed herein are embodiments of a system and method for retaining one or more parts for laser processing (e.g., laser welding) of one or more parts.

An aspect of a system for laser processing described herein includes a plate assembly comprising a first plate, a second plate secured to the first plate, and a pressure chamber located between the first plate and the second plate, a connector extending into the pressure chamber and in fluid communication with the pressure chamber, and a fixture having a first end and a second end, wherein the first end is attached to the second plate of the plate assembly, the second end has a surface shaped to fit a part to be retained and laser processed, the surface has at least one opening, and the fixture has a conduit extending therethrough in fluid communication with the pressure chamber and the at least one opening.

In some aspects, a laser system may be positioned on a first side of the plate assembly, while the fixture (and the one or more parts held thereby) may be positioned on a second, opposite side of the plate assembly. However, the first plate and the second plate may be formed of transparent material. Accordingly, the laser system may direct a laser beam through the first plate and the second plate to reach the part held by the fixture without additional structures that would otherwise be responsible for such retention from interfering with or blocking a laser beam.

An aspect of a method of laser processing described herein includes generating a positive or negative pressure within a pressure chamber located between by a first plate and a second plate secured to the first plate and forming a plate assembly, wherein generating the positive or negative pressure comprises using a connector extending into the pressure chamber and in fluid communication with the pressure chamber, using the positive or negative pressure to hold a part to be retained and laser processed in a fixed position with respect to the pressure chamber using a fixture having a first end and a second end, wherein the first end is attached to the second plate of the plate assembly, the second end has a surface shaped to fit the part, the surface has at least one opening, and the fixture has a conduit extending therethrough in fluid communication with the pressure chamber and the at least one opening, and directing a laser beam at the part through the pressure chamber without passing the laser beam through the fixture. Thus, the pressure chamber and fixture aid in securing a part in a fixed position without interfering with the laser processing of the part.

Another aspect of a system for laser processing described herein includes an inner plate and an outer plate spaced apart to form a pressure chamber therebetween, a pressure valve pneumatically coupled with the pressure chamber, and a fixture extending perpendicularly from an inner end in contact with the inner plate to an outer end having a surface shaped to conform to a part to be retained and laser processed, wherein the fixture has at least one path from the inner end to the outer end that pneumatically couples the pressure chamber to at least one opening extending through the surface of the outer end.

Another aspect of a method for laser processing described herein includes aligning a fixture with a part to be retained and laser processed, wherein the fixture extends perpendicularly from an inner end adjacent to a pressure chamber to an outer end having a surface shaped to conform to the part, wherein the pressure chamber is formed between an inner plate and an outer plate that are spaced apart, the inner end is in contact with the inner plate, and the fixture has at least one path from the inner end to the outer end that pneumatically couples the pressure chamber to at least one opening extending through the surface of the outer end, creating a vacuum between the fixture and the part using the pressure chamber by drawing air through the surface of the outer end, moving a mating part corresponding to the part into a laser processing position, laser processing the part; and releasing the vacuum after laser processing the part.

Details of these and other aspects and implementations of laser part retention and laser processing are described in additional detail with reference to the description and drawings.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Avoiding interference or inadvertent blocking of a laser beam with any components of a laser processing system can be complicated where the processing involves a laser beam that traverses or moves across a surface of a part, such as in laser welding. This is particularly an issue where a part must be retained to correctly perform the laser processing. For example, an air hose or other obstacle may interfere with or block a path of a laser beam as it travels from a laser source to a weld joint or along a weld path.

Figure 1:
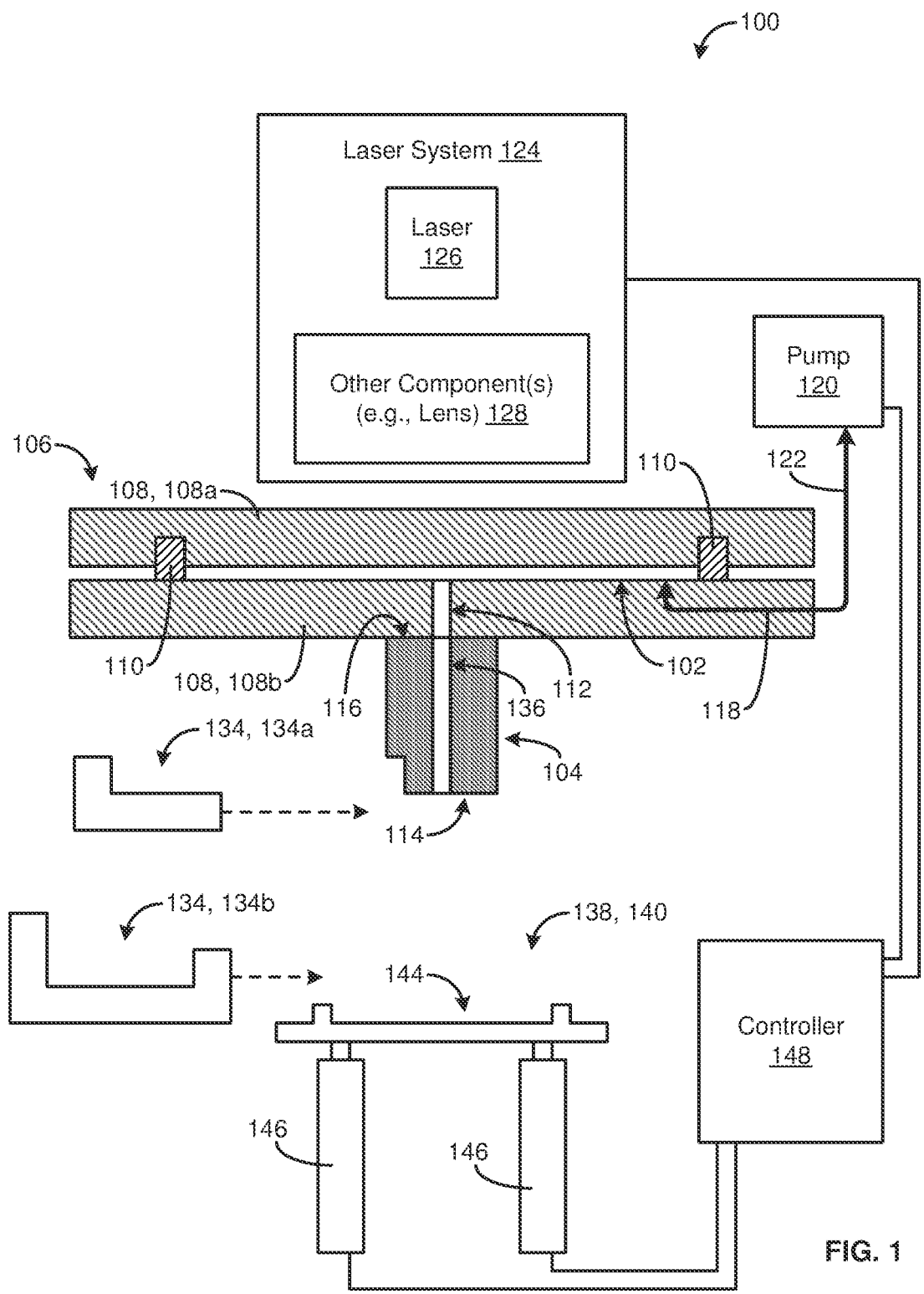
FIG. 1 is a schematic diagram of an embodiment of a system for laser processing one or more parts, wherein a press thereof is in a retracted position and the part(s) are not yet applied or inserted.
Figure 2:
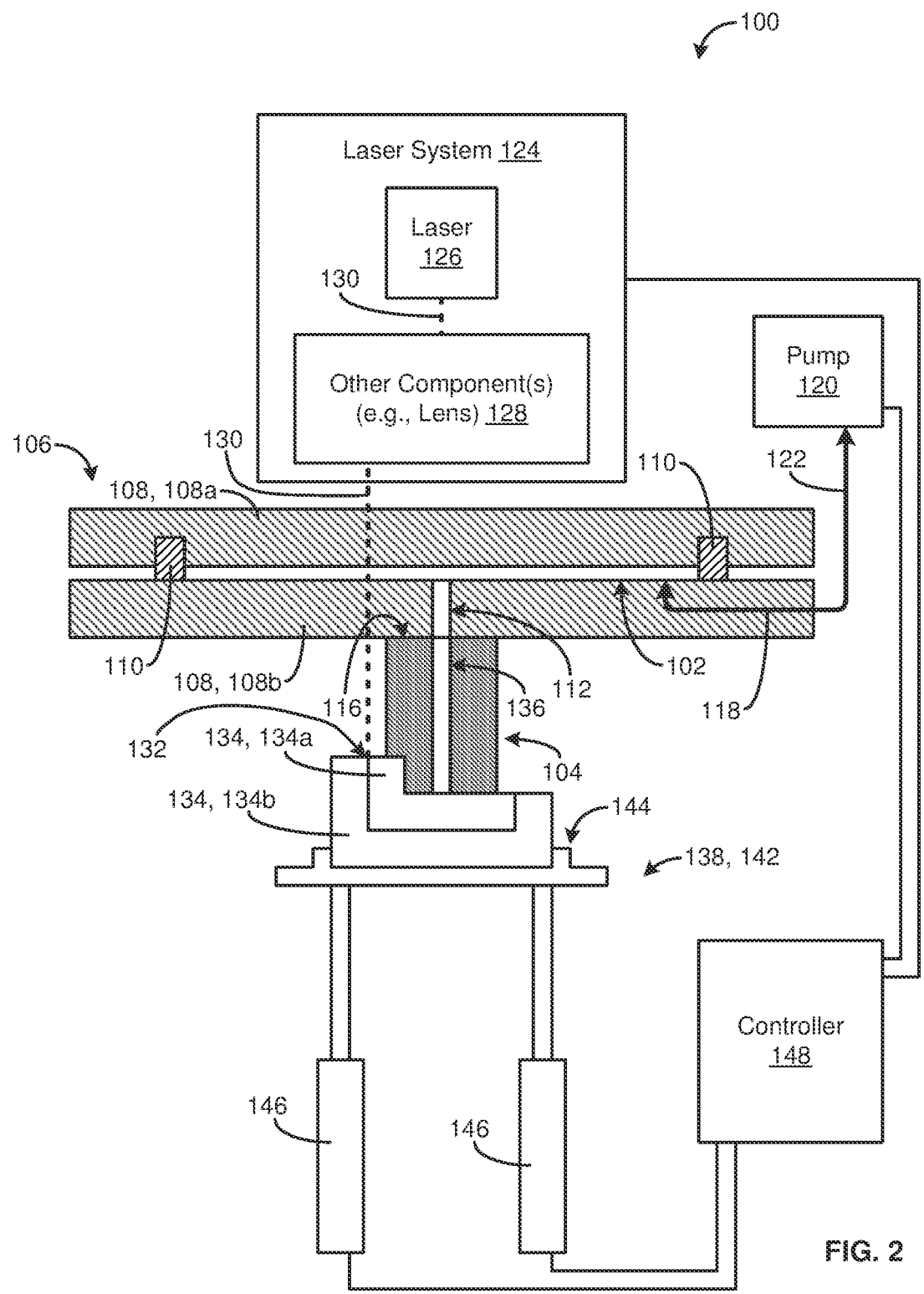
FIG. 2 is a schematic diagram of the system of FIG. 1, wherein part(s) have been applied or inserted and the press is in an extended position.

One example of a system 100 for part retention that addresses this issue is shown in FIGS. 1 and 2. The system 100 may include a pressure chamber 102 and a fixture 104 that is in fluid communication with (e.g., pneumatically coupled to) the pressure chamber 102. In selected embodiments, a pressure chamber 102 may be formed or defined by a plate assembly 106. A plate assembly 106 may include opposing walls, plates 108, or the like. For example, a plate assembly 106 may comprise a first plate 108*a*, a second plate 108*b* secured to the first plate 108*a*, and a gasket or seal 110 positioned between the first plate 108*a* and the second plate 108*b*. In such embodiments, a pressure chamber 102 may be located between the first plate 108*a* and the second plate 108*b* and interior to the seal 110. A fixture 104 may be in fluid communication with a pressure chamber 102 via an opening or aperture 112 extending through the second plate 108*b*.

In certain embodiments, the second plate 108*b* may also be referred to as an inner plate because it faces the fixture 104, while the first plate 108*a* may be referred to as an outer plate. The fixture 104 may extend away from the inner plate 108*b* in a substantially cylindrical shape in this example. In other implementations, the fixture 104 may have other shapes. For example, the fixture 104 may have a frustoconical shape. While not required, and regardless of the shape, it may be desirable that a part-facing, outer or second end 114 of the fixture 104 have larger dimensions or a larger area than the dimensions or area of a mounting or first end 116 of the fixture 104, and that no outer portion of the fixture 104 have larger dimensions than the second end 114. These latter shapes may be particularly useful where a relatively large part is being supported by the fixture 104 as compared to the size of the facing surface of the pressure chamber 102. This allows the laser beam, described in more detail below, a broader range of operating angles with respect to a surface of the part.

The pressure chamber 102 may be airtight and include or be accessed by a connector or pressure port 118. As shown in the illustrated example, the pressure port 118 extends through the second plate 108*b*, but the pressure port 118 may be located elsewhere so long as it is in fluid communication with (e.g., pneumatically coupled to) the pressure chamber 102 in an airtight fashion and does not interfere with a path of a laser beam. The pressure port 118 may be in fluid communication with a pump 120 through a coupling or conduit 122 such as a hose or tube. A pump 120 may be any mechanism or system capable of generating a pressure differential (e.g., a positive or negative pressure) between the pressure chamber 102 and an ambient environment. In some implementations, the pump 120 may comprise a vacuum system that draws a vacuum (i.e., produces a negative pressure, which may be defined as a pressure that is below an ambient pressure) within the pressure chamber 102. The pump 120 may incorporate one or more pressure sensors (not separately shown), a feedback control loop, or the like as necessary to support a desire functionality of the pump 120.

In some embodiments, the system 100 includes a laser system 124. In FIGS. 1 and 2, the laser system 124 is shown schematically because a variety of arrangements is possible. In certain implementations including the laser system 124, the laser system 124 comprises a beam generator or laser 126 and one or more other sub-systems or components 128 (e.g., one or more lens, mirrors, or the like) that focus, aim, and/or direct a laser beam 130 produced by the laser 126. For example, the components 128 may direct a laser beam 130 along a path to form a weld joint at an incidence of that laser beam 130. A path may have an incidence (and a corresponding weld joint may be formed) at an abutment, and engagement, or an interface 132 between two or more parts 134 (e.g., at an interface between a first part 134*a* and a second part 134*b*) in this example.

The fixture 104, the plate assembly 106, the pump 120, and the one or more conduits or connections therebetween enable one or more parts 134 to be held for laser processing (e.g., laser welding or laser contouring) without interfering with or blocking selected laser paths to any part 134. For example, while the laser system 124 is located on a first side of the plate assembly 106 and the fixture 104 and the part 134 secured thereby may be located on a second side of the plate assembly 106, the first plate 108*a* and the second plate 108*b* of the plate assembly 106 may be formed of transparent material. The transparent material may be glass, a polymeric material, or the like. The transparent material may be selected to minimize or eliminate refraction of infrared (IR) or near infrared (NIR) energy of the laser beam 130. Accordingly, the laser beam 130 that originates with the laser system 124 may pass through the first plate 108*a* and the second plate 108*b* to reach one or more parts 134 located on an opposite side of the plate assembly 106 without the plates 108 significantly degrading the ability of the laser beam 130 to perform the intended processing on the parts 134. If the laser system 124 using a different energy is employed, the material of the plates 108 may be changed or adapted accordingly.

As shown by example, the fixture 104 includes a conduit 136 extending from a first end 116 of the fixture 104 to a second end 114 of the fixture 104. Such a conduit 136 may be in fluid communication with an aperture 112 extending through the second plate 108*b*. Accordingly, a pressure differential between the pressure chamber 102 and an ambient environment may be used to secure one or more parts 134, in this example the first part 134*a*, to the second end 114 of the fixture 104. For example, a negative pressure within the pressure chamber 102 may result in a suction force within the conduit 136 proximate the second end 114 of the fixture 104. This suction force may be used to hold the first part 134a in a fixed position with respect to the fixture 104 and optionally the second part 134b.

In certain embodiments, the second end 114 of the fixture 104 may be sized and shaped to register a part. That is, in laser processing, it may be necessary to sequentially process numerous parts 134 that are identical to one another. Accordingly, the second end 114 of the fixture 104 may have a shape that receives each such part 134 in only an acceptable orientation. For example, when a part, such as the first part 134, is applied to the fixture 104 (e.g., seated on the second end 114 of the fixture 104), a proper orientation of the part with respect to the rest of the system 100 may be guaranteed and a laser processing corresponding thereto may proceed in a predictable (e.g., predetermined, repetitive, automated) manner. Different fixtures 104 may be used to process (e.g., register and secure) different parts 134. Thus, fixtures 104 may be swapped in and out of the system 100 as desired or necessary, depending on what part is being processed during a particular time period.

In certain applications where two or more parts are laser processed together it may be necessary to hold the multiple parts. Accordingly, the system 100 may include a press 138. The press 138 may cooperate with the fixture 104 to hold parts, such as the parts 134, in a fixed relationship with respect to one another. As shown in the example of FIGS. 1 and 2, respectively, the press 138 has a retracted position 140 and an extended position 142. In the retracted position 140, the first part 134a may be manually or robotically applied to the fixture 104 and the second part 134b may be manually or robotically applied to the press 138. Thereafter, the press 138 may move from the retracted position 140 to the extended position 142. In the extended position 142, the press 138 and the fixture 104 may cooperate to hold the first part 134a and the second part 134b against one another so that the interface 32 therebetween may be laser processed (e.g., laser welded).

A surface of the part 134a facing away from the fixture 104 may be shaped to conform, at least in part, to a surface of a mating part, here the second part 134b, such that the first part 134a and the second part 134b have engaged surfaces for application of a laser beam to form one or more weld joints therebetween. A surface of the second end 114 of the fixture 104 may be shaped so that the engaged surfaces between the parts are subjected to a constant pressure during laser processing, but this is not required.

In some implementations, the press 138 comprises a registration portion 144 and an actuator 146. In FIGS. 1 and 2, two actuators 146 (e.g., one or more air cylinders, hydraulic cylinders, linear actuators, solenoids, or the like) are connected and controlled to selectively move the registration portion 144 back and forth between the retracted position 140 and the extended position 142. The registration portion 144 may have a shape that receives a part, such as the second part 134b, in only an acceptable orientation. As a result, when each part is applied to the registration portion 144, a proper orientation of the part with respect to the rest of a system 100 may be guaranteed and a laser processing corresponding thereto may proceed in a predictable (e.g., predetermined, repetitive, automated) manner. Different presses 138 or registration portions 144 may be used to process (e.g., register) different parts. Thus, the presses 138 or the registration portions 144 thereof may be swapped in and out of the system 100 as desired or necessary, depending on which parts are being processed during a particular time period.

The laser system 124 or selected components thereof (e.g., the laser 126 and/or one or more other components 128), the pump 120, the press 138, or the like or a combination or sub-combination thereof may be controlled by a controller 148. The controller 148 may be or comprise a computer, a microprocessor, hardware, software, or any other components that can control one or more aspects of the laser system 124, the pump 120, the press 138, or the like. For example, the controller 148 may control when the laser 126 and/or the pump 120 turns ON or OFF. Similarly, the controller 148 may control when the press 138 transitions between the retracted position 140 and the extended position 142.

In some embodiments, a controller, such as the controller 148, may control relative motion between selected components of the system 100. For example, to laser weld the elongated interface 132 between the parts 134, an incidence of the laser beam 130 may travel along that interface 132. This may be accomplished by moving the laser 126 with respect to the plate assembly 106 and corresponding fixture 104, moving the plate assembly 106 and corresponding fixture 104 with respect to the laser 126, using one or more components 128 (e.g., a mirror and/or a lens) to move, gradually redirect, or steer the laser beam 130, or the like or a combination or sub-combination thereof. Accordingly, the controller 148 may control all or one or more aspects of such relative motion. Alternatively, a plurality of controllers or a combination of one or more controllers and one or more manual activities may control all or one or more aspects of such relative motion.

Figure 3:
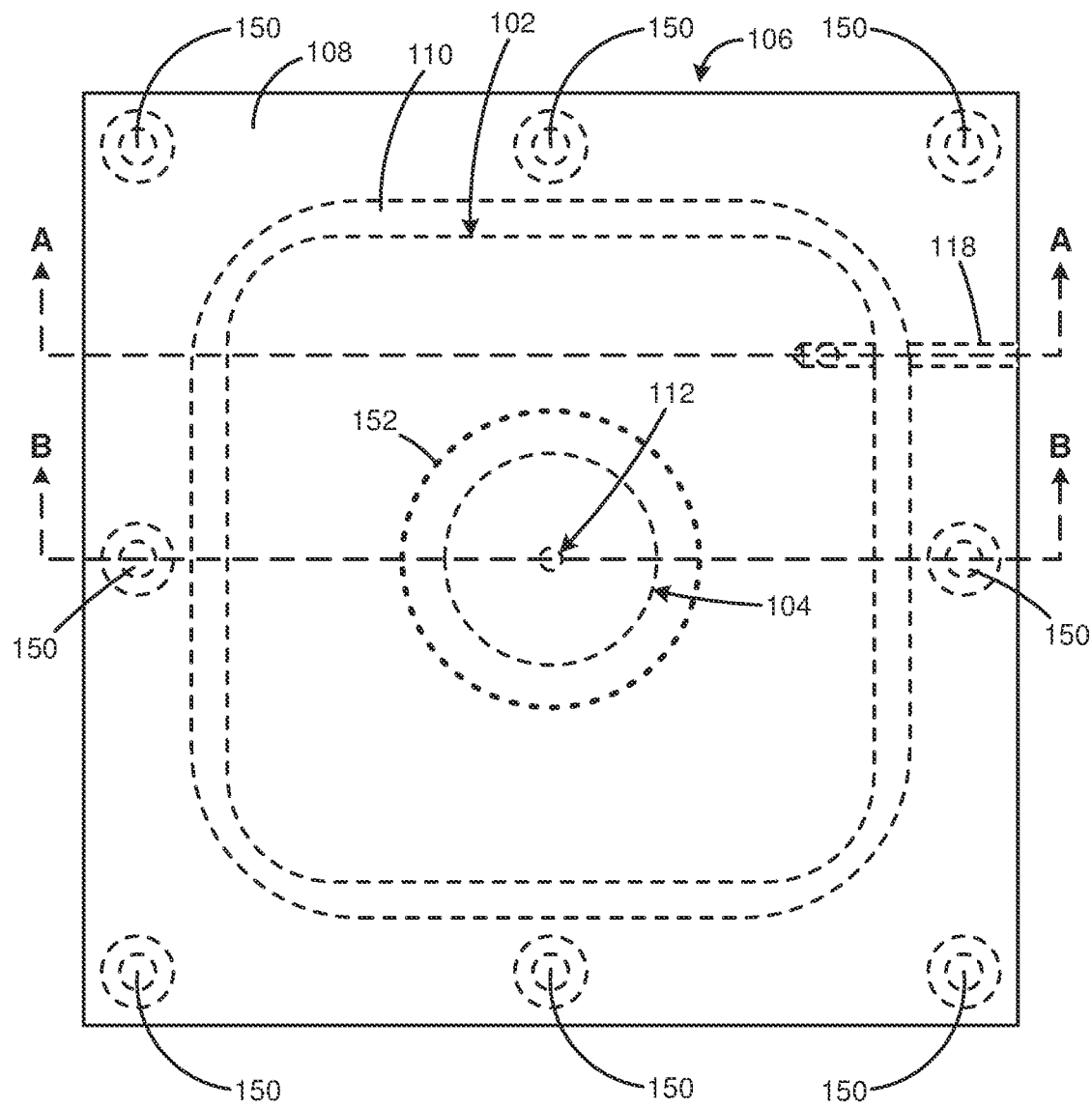
FIG. 3 is a plan view of an embodiment of a plate assembly.

Referring to FIG. 3, the gasket or seal 110 may be placed between the first plate 108a and the second plate 108b and be secured in position (e.g., compressed) by multiple fasteners 150 (e.g., threaded bolts) that press or urge the first plate 108a and the second plate 108b together. In this example, the seal 110 encircles a certain amount of space within the plate assembly 106. This encircled space may be or define the pressure chamber 102.

The fixture 104 and the aperture 112 in fluid communication therewith may be substantially centrally located with respect to the pressure chamber 102 when the plate assembly 106 is viewed as depicted in FIG. 3. Conversely, the pressure port 118 may be located proximate an edge or radial extreme of a pressure chamber 102. Accordingly, a transparent, uninterrupted annulus of the plate assembly 106 may be seen when the plate assembly 106 is viewed as depicted. This annulus may provide space through which the laser beam 130 may pass or move without interference during laser processing.

For example, the laser beam 130 may pass in an axial direction (e.g., a direction orthogonal to the plates 108) through the plate assembly 106. Accordingly, as the laser beam 130 moves in a radial and/or circumferential direction with respect to the plate assembly 106 or the plate assembly 106 moves in a radial and/or circumferential direction with respect to the laser beam 130, an incidence of the laser beam 130 may follow a path 152 about the edge of a part that extends beyond the outer edges of the part-facing surface of a fixture, such as the second end of the fixture 104. Thus, the system 100 may produce a circumferentially continuous weld all the way around a circumference or perimeter of a part 134 or collection of parts 134. The laser beam 130 may operate along a continuous path as shown in this example or may operate along discontinuous paths about the circumference of the part-facing surface of the fixture. The discontinuous paths may include one or more radially-extending paths.

Figure 4:
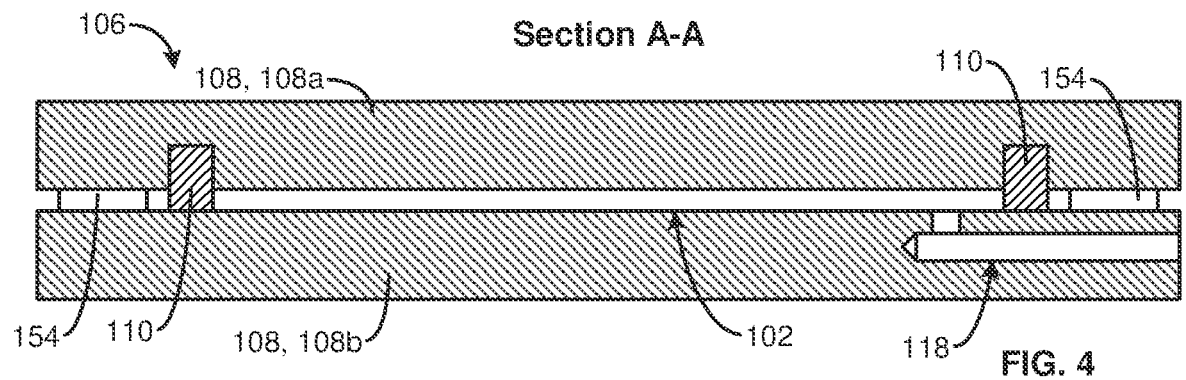
FIG. 4 is a first cross-sectional view of the plate assembly of FIG. 3.
Figure 5:
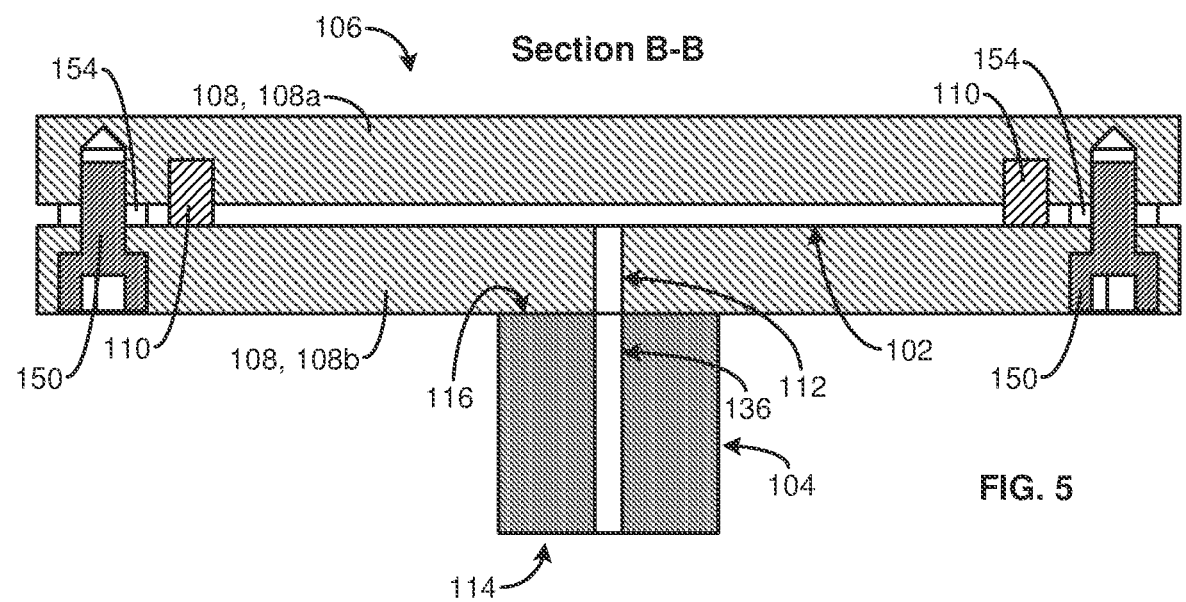
FIG. 5 is a second cross-sectional view of the plate assembly of FIG. 3.

Referring to FIGS. 4 and 5, while the fasteners 150 may be used in certain embodiments to secure the first plate 108a to the second plate 108b, other embodiments may include or use other mechanisms such as clamps or the like. Accordingly, clamps may be used instead of, or in combination with, threaded bolts.

In some embodiments, spacers 154 (e.g., rubber washers, polymeric washers, metal washers, or the like) may be arranged on one or more of the fasteners 150 between the plates 108. Such spacers 154 may define a minimum gap between the first plate 108a and the second plate 108b (e.g., a gap of at least a selected distance or width is preserved). Accordingly, the spacers 154 may define at least one dimension (e.g., a thickness or height) of the pressure chamber 102. Depending on the size of the 108, one or more spacers 154 may be located between the plates 108 near a center of the pressure chamber 102 (e.g., near the aperture 112 and within a footprint of the first end 116 of the fixture 104). Such centrally located spacers 154 may assist in maintaining a desired spacing or gap between the plates 10 when they might otherwise deflect inward due to a negative pressure within the pressure chamber 102. Alternatively, or in addition thereto, the first plate 108a and/or the second plate 108b may each have a thickness selected to enable them to withstand without excessive deflection the positive or negative pressures that the pressure chamber 102 may experience.

Figure 6:
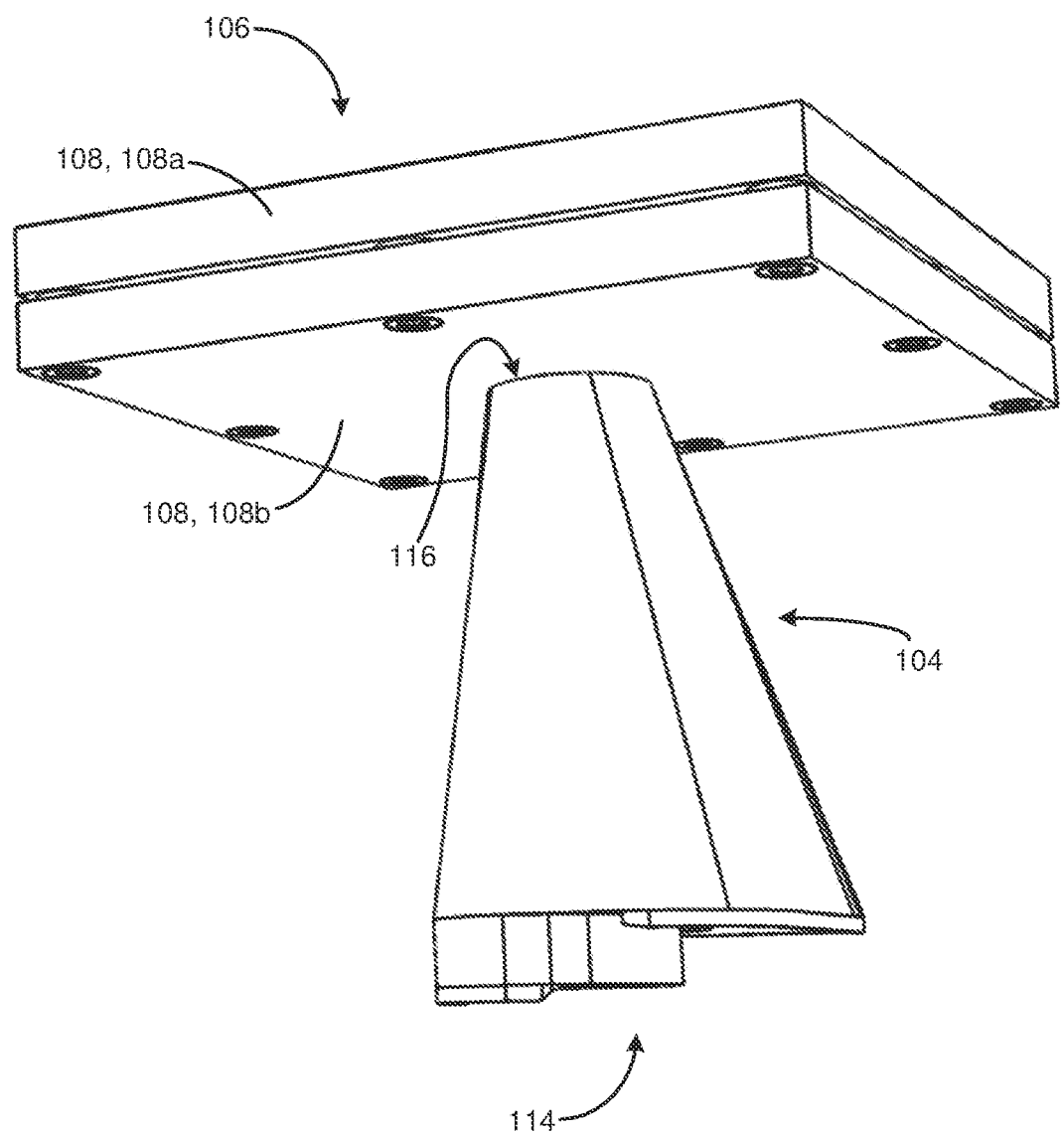
FIG. 6 is a perspective view of an alternative embodiment of a plate assembly and fixture.

Referring to FIG. 6, the first plate 108a and the second plate 108b of the plate assembly 106 may be positioned and secured to be parallel to one another. As illustrated, the first plate 108a and the second plate 108b extend horizontally (i.e., be generally parallel to a ground surface). However, in other embodiments, the plates 108 may be arranged in any orientation, together with the fixture 104, that is necessary to support the desired functionality of the system 100 (e.g., the desired processing of a part).

The plate assembly 106 may be secured in place in any suitable manner. For example, one or more supports (not shown) may extend and engage or be secured to an outer edge or perimeter of a plate assembly 106. Accordingly, the supports need not block or interfere with a laser beam 130 passing (e.g., axially or perpendicularly) through the plate assembly 106. Such supports may be mounted in a fixed position or may be mounted on a structure (e.g., a gantry, a two-axis or three-axis computerized numerical control (CNC) system, or the like) that allows or enables movement of the corresponding plate assembly 106 in two or three directions (e.g., two or three directions that extend orthogonally with respect to one another). When the plate assembly 106 is mounted for movement, its movement may be controlled by the controller 148. In some implementations, the plate assembly 106 may be supported by a press similar to the press 138. Then, if more than one part is being processed, another part such as the second part 134b may be supported by a fixed support such that the plate assembly 106 may be raised and lowered to engage the first part 134a supported on the second end 114 of the fixture 104.

Figure 7:
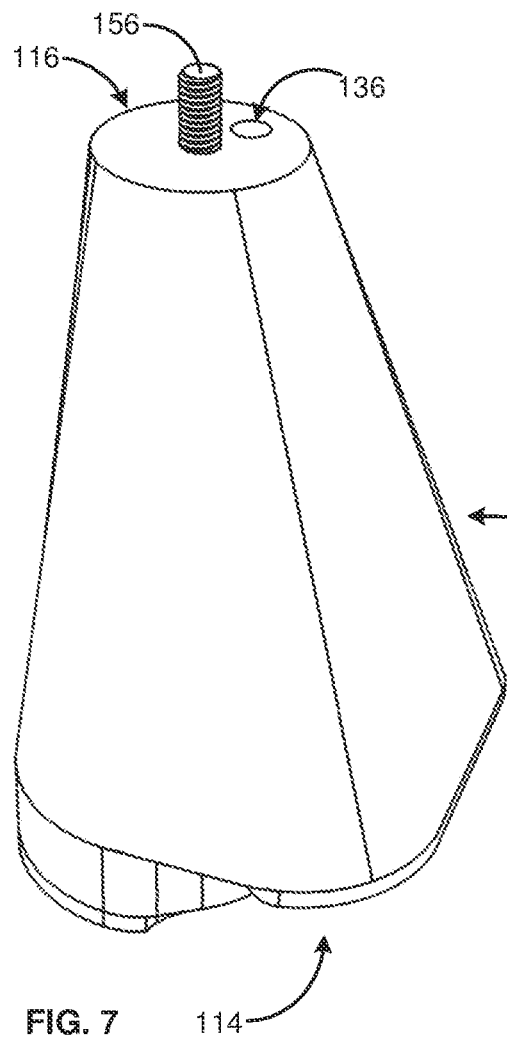
FIG. 7 is a perspective view of the fixture of FIG. 6.
Figure 8:
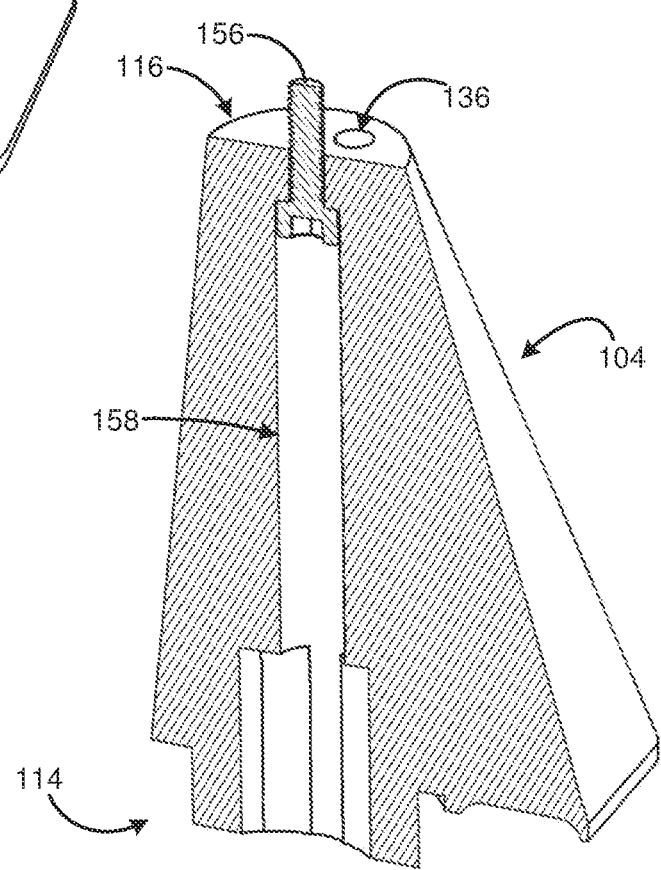
FIG. 8 is a first cross-sectional view of the fixture of FIG. 6.

Referring to FIGS. 7 and 8, a fixture such as the fixture 104 may be secured to the plate assembly 106 in any suitable manner. In this example, one or more fasteners 156 may extend from the fixture 104 to engage the plate assembly 106. The fixture 104 may include an access aperture 158. Accordingly, the fastener 156 may be inserted within the access aperture 158 and extend therefrom to engage the second plate 108b (e.g., via a threaded engagement). The fixture 104 may be positioned and/or oriented with respect to the plate assembly 106 such that the conduit 136 of the fixture 104 aligns with the aperture 112 in the second plate 108b. As illustrated, the fastener 156 is centrally located at the first end 116 of the fixture 104, and the conduit 136 is offset from a center of the first end 116.

Figure 9:
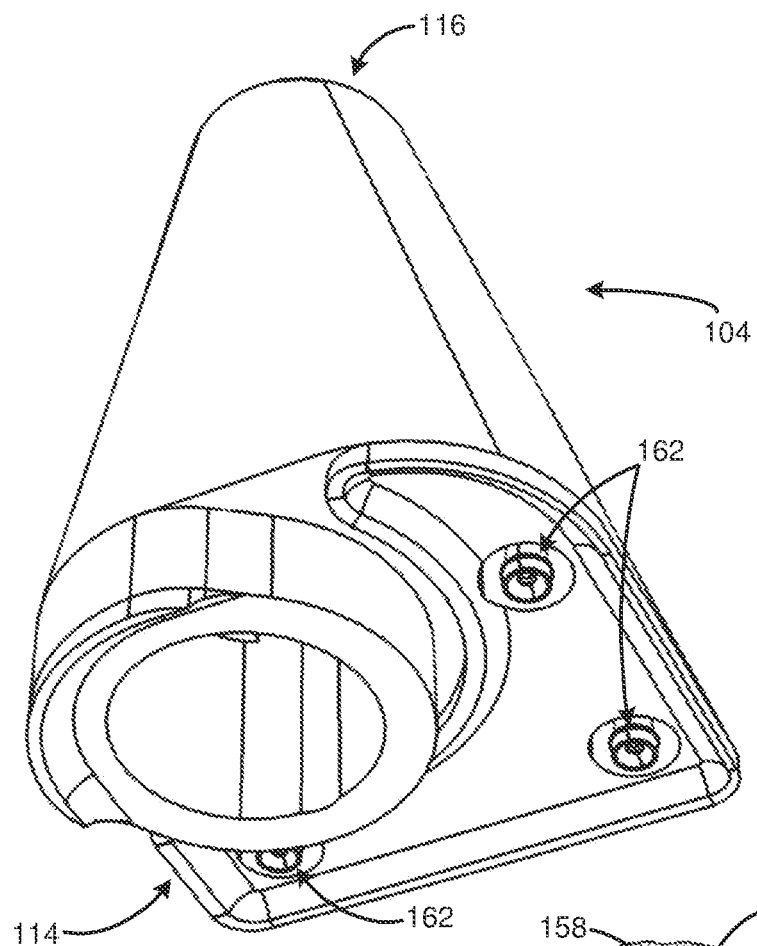
FIG. 9 is a second cross-sectional view of the fixture of FIG. 6.
Figure 10:
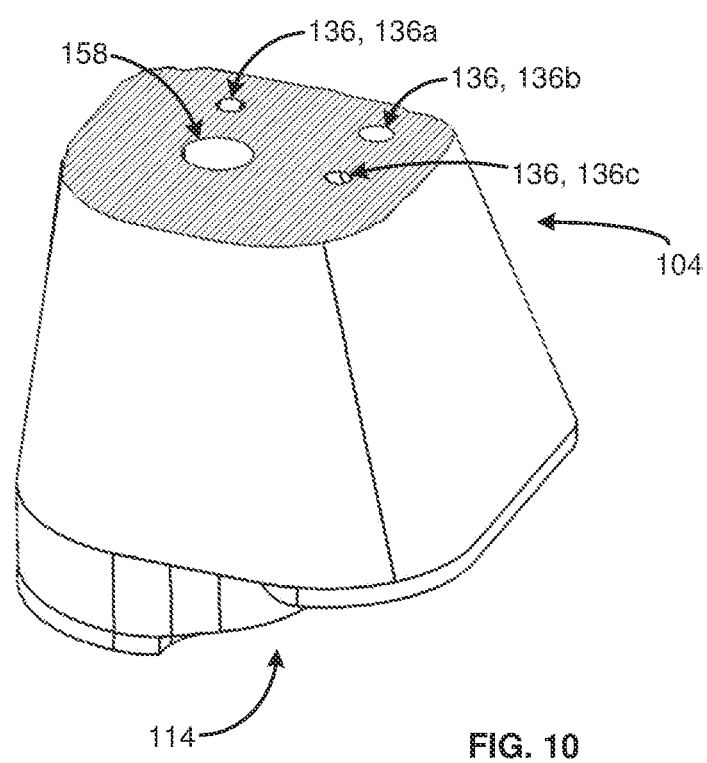
FIG. 10 is another perspective view of the fixture of FIG. 6.
Figure 11:
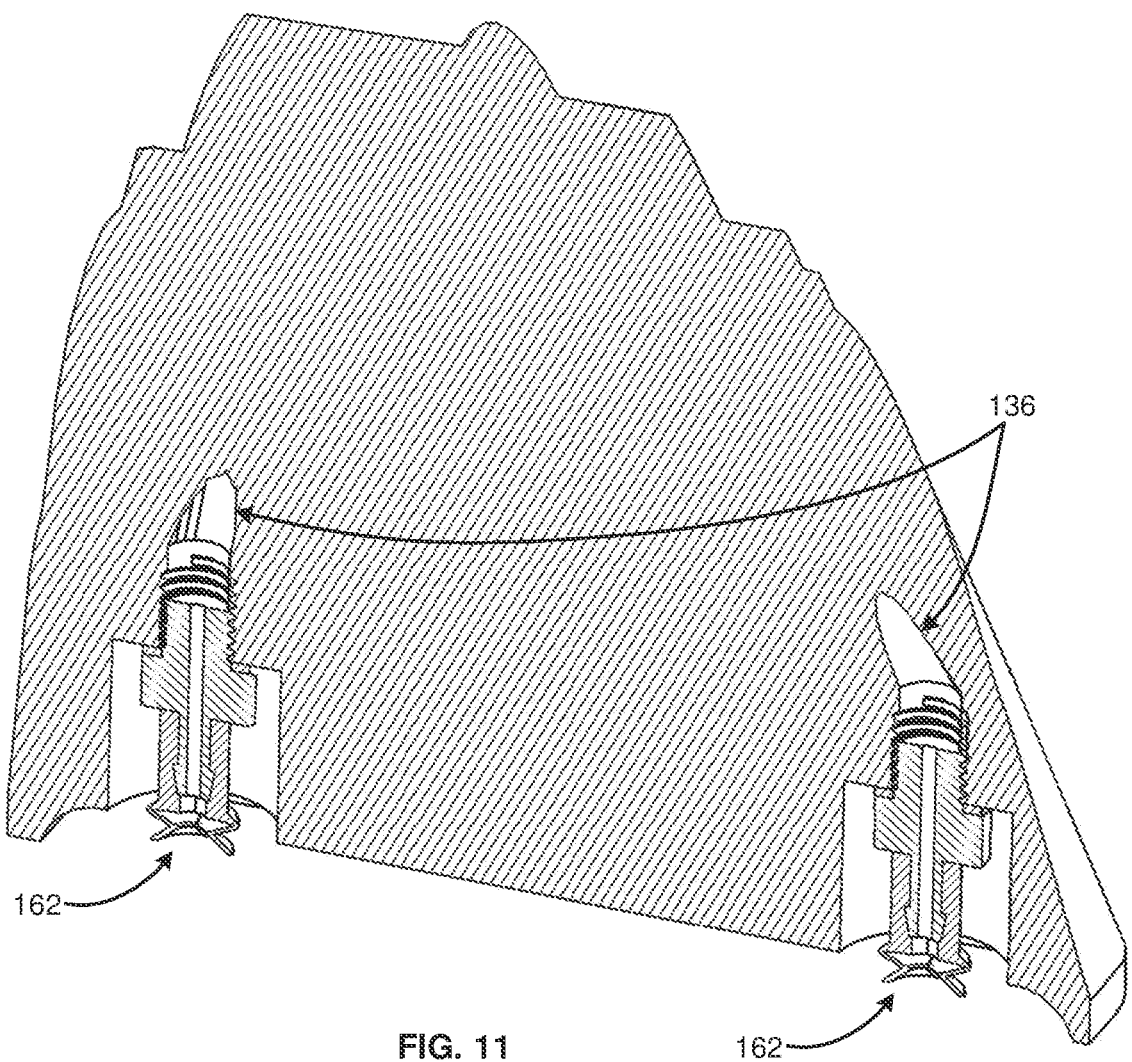
FIG. 11 is a third cross-sectional view of the fixture of FIG. 6.

Referring to FIGS. 9-11, the second end 114 of the fixture 104 may support and/or retain a part 134 in a desired location and orientation for laser processing as described previously. The fixture 104 may be made of any suitable material. The fixture 104 may be formed in an additive manufacturing or 3D printing process. This can enable the fixture 104 to have features (e.g., an arrangement of internal conduits 136) that are inaccessible or difficult to produce using other manufacturing methods. In some embodiments, the material of the fixture 104 is a thermoplastic polymer (e.g., nylon, Polybutylene Terephthalate (PBT), or the like) that is well suited to 3D printing.

The view of FIG. 9 shows details of an example of the second end 114 of the fixture 104. As illustrated, the second end 114 has a surface that is shaped to conform to or accommodate the surface of a corresponding part, such as the first part 134a. Depending on the nature of the corresponding part, the surface may include one or more recesses, one or more extensions, one or more vacuum cups 162, or the like or a combination or sub-combination thereof. In some embodiments, the surface at the second end 114 may include a plurality of ribs that allow the passage of air to and from the pressure chamber 102 through vacuum cup(s) 162. One or more vacuum cups 162 may be located to be aligned with flat surfaces of the corresponding part. The second end 114 may have outer dimensions or a perimeter that is within (e.g., radially inboard of) the outer dimensions or perimeter of the corresponding part. That is, at least a portion of the corresponding part may extend radially outward from the second end 114 of the fixture 104 so that it can be accessed by the laser beam 130 during laser processing. The number and locations of the vacuum cups may depend upon factors such as the weight of the part, the shape of the part, the strength of the pump 120, the size (e.g., diameter) of the conduits 136, the size the opening or aperture 112, the size of the pressure port 118, the size (e.g., area) of the pressure chamber 102, or some combination thereof.

As shown in FIG. 10, an interior of the fixture 104 may be at least partially hollow. Tubing or the like may extend within the fixture 104 to connect an aperture, such as the conduit 136, corresponding to the first end 116 to a respective vacuum cup 162 or the like corresponding to the second end 114. Alternatively, the fixture 104 may be formed (e.g., 3D printed) to include one or more conduits 136 extending from the first end 116 to the second end 114. For example, one or more vacuum cups 162 located on the second end 114 of the fixture 104 may be in fluid communication with (e.g., pneumatically coupled to) the pressure chamber 102 via one or more conduits 136 such as shown by example in FIG. 11. Certain such conduits 136a, 136b, 136c may be branches of a primary conduit 136 corresponding to the first end 116 of the corresponding fixture 104. Accordingly, various vacuum cups 162 may be placed in fluid communication with the pressure chamber 102. This may improve an ability of the fixture 104 to properly or adequately secure or hold a part, such as the first part 134a. Moreover, such conduits 136a, 136b, 136c may have the same size (e.g., diameter and/or length), or may comprise tubes of different sizes to produce different suction effects.

The arrangement of the conduits 136 and vacuum cups 162 described herein are by example only. So long as the fixture has at least one path from the inner end to the outer end that pneumatically couples the pressure chamber to at least one opening extending through the surface of the outer, part-facing end.

Figure 12:
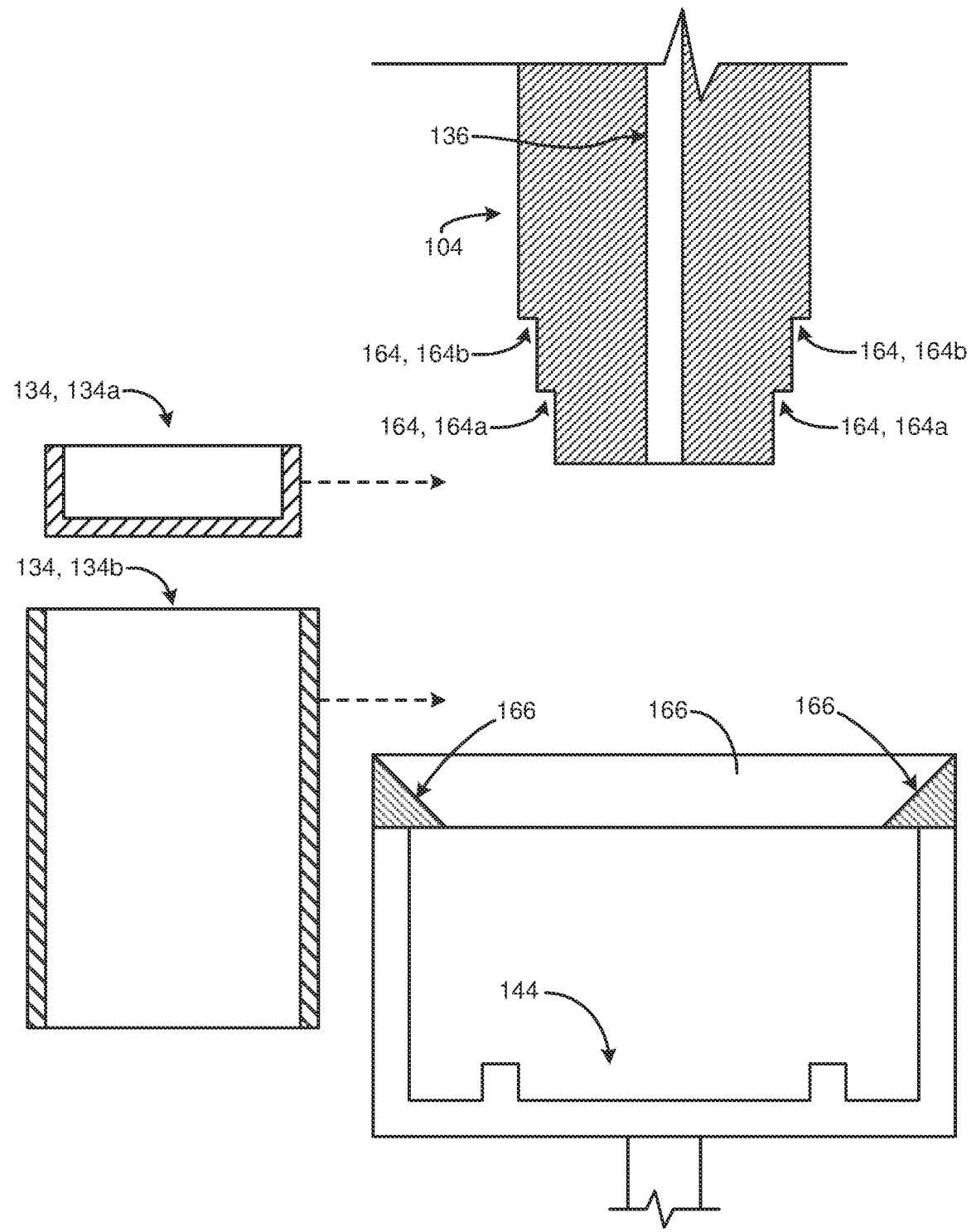
FIG. 12 is a schematic diagram of an alternative embodiment of a portion of a system for laser processing one or more parts, wherein a press is in a retracted position and the part(s) are not yet applied or inserted.
Figure 13:
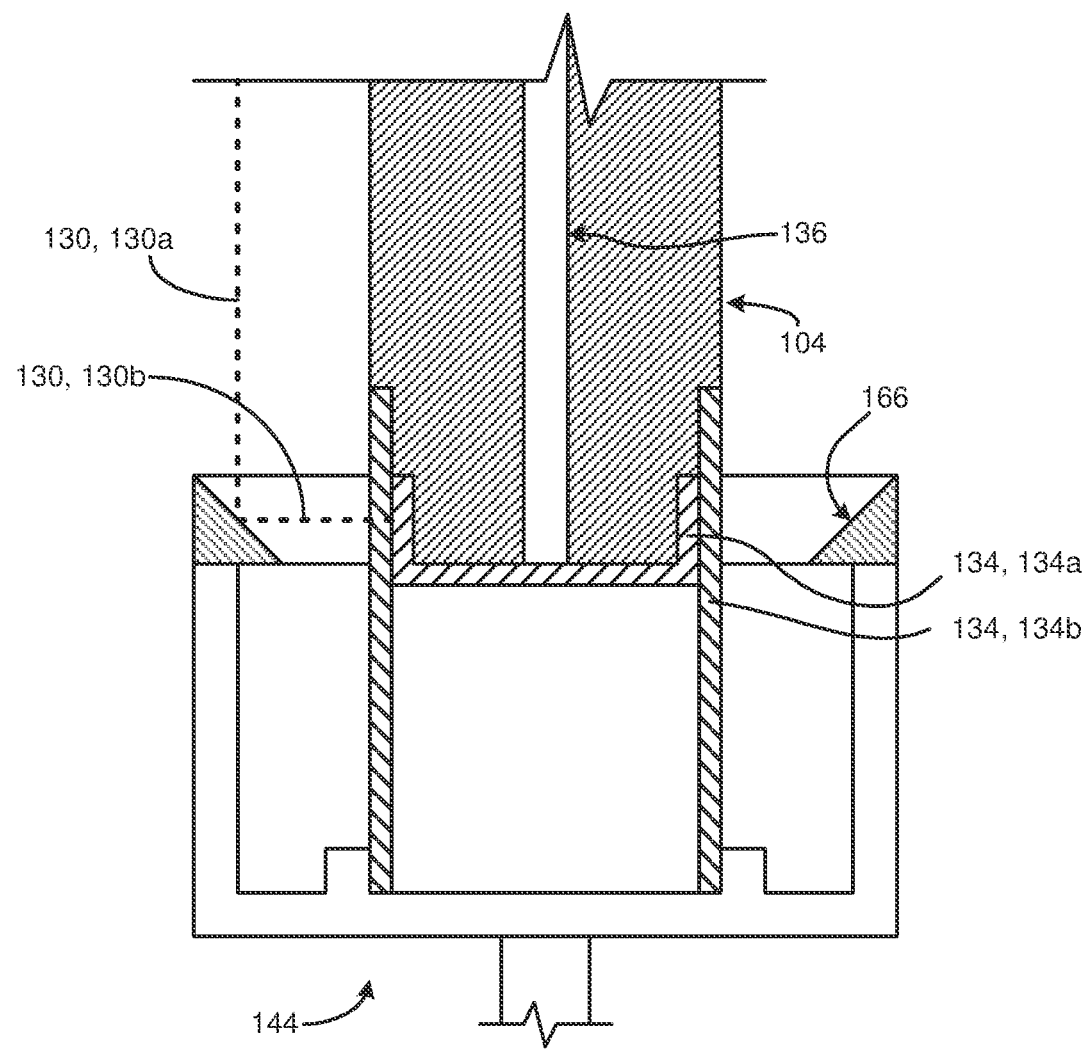
FIG. 13 is a schematic diagram of the portion of the system of FIG. 12, wherein the part(s) have been applied or inserted and the press is in an extended position.

Referring to FIGS. 12 and 13, the fixture 104 may include multiple registration surfaces 164. In the example shown, the fixture 104 includes a first registration surface 164a that holds the first part 134a in a desired location and a second registration surface 164b that holds the second part 134b in a desired location. The fixture 104 may register two or more parts 134 with respect to one another. For example, the first part 134a may be nested within the second part 134b. When the first part 134a is applied to the fixture 104, a suction effect may hold the first part 134a in place. Accordingly, when the second part 134b is applied to the press 138 and the press 138 moves to the extended position 142, the first part 134a may be inserted within the second part 134b and the registration surfaces 164 of the fixture 104 may ensure that the parts 134 are properly positioned with respect to one another (e.g., in a nested arrangement or with a partial or complete overlap of first part with the second part).

In some embodiments, the system 100 may support or enable laser processing (e.g., laser welding or laser micromachining) using one or more mirrors 166 to control how one or more laser beams 130 reach one or more parts 134. For example, as shown in the illustrated embodiment, the mirror 166 forms an annular mirror surface that surround or encircle an assembly of the first part 134a and the second part 134b. Such an annular mirror surface may convert an axially directed laser beam 130a into a radially directed laser beam 130b. Thus, as the axially directed laser beam 130a travels around the annular mirror surface, the corresponding radially directed laser beam 130b may travel around the assembly to provide the desired laser processing. Accordingly, mirrors may enable a laser beam 130 to access one or more parts 134 in any suitable or desired direction.

A mirror 166 (here the annular mirror surface) may be held in place with respect to the assembly of parts 134 in any suitable manner. For example, the mirror 166 may be secured to and move with the press 138. Accordingly, the mirror 166 may be moved into and held in a desired location as the press 138 moves into and remains in the extended position 142. In other embodiments, the mirror 166 may be secured in other ways (e.g., be secure or held by structures that are independent of both the fixture 104 and the press 138).

In the example of FIGS. 12 and 13, the laser beam 130 may need to travel through a material of the second part 134b before it can reach the interface 132 between the second part 134b and the first part 134a. In such embodiments, the material of the second part 134b may have a relatively high transmittance of the light or energy corresponding to the laser beam 130 when compared with a transmittance of the first part 134a. Accordingly, relatively little heating (e.g., insufficient heating for melting) may occur as the laser beam 130 travels through the material of the second part 134b. However, as the laser beam 130 reaches the first part 134a, sufficient heat may be generated to produce the desired effect (e.g., a laser weld between the two parts 134a, 134b).

Figure 14:
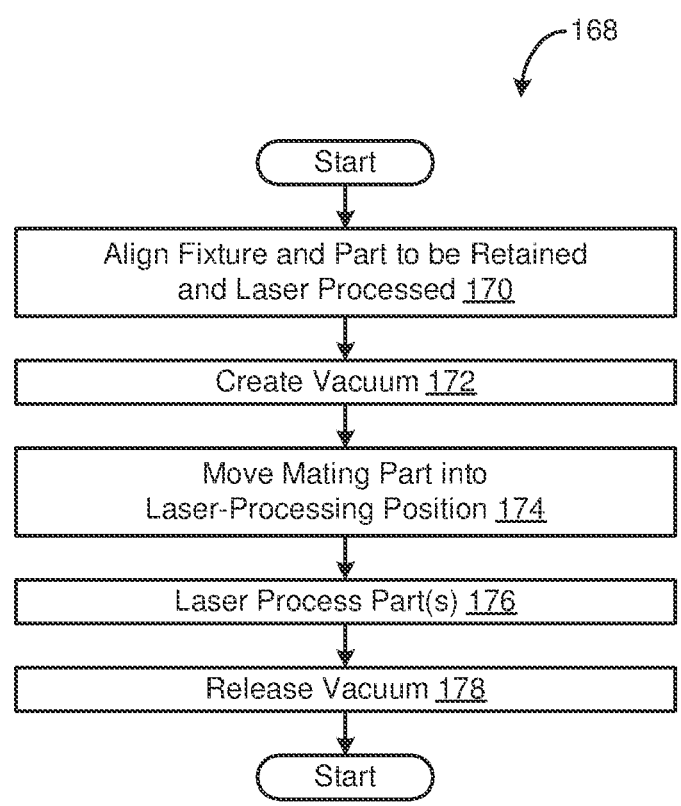
FIG. 14 is a block diagram of one embodiment of a method of laser processing one or more parts.

Referring to FIG. 14, a method for laser processing 168 may include aligning 170 the fixture 104 with the part 134 or parts 134 to be retained and laser processed. Thereafter, a vacuum may be created 172. This may occur by pulling air from the surface of the part 134 that faces the second end 114 of the fixture 104 through one or more vacuum cups 162. The air then flows from the vacuum cups 162 through respective conduits 136, through the aperture 112 in the second plate 108b, and into the pressure chamber 102. From the pressure chamber 102, the air may flow through the pressure port 118, one or more conduits 122 (e.g., hoses) and into the pump 120 that created 172 the vacuum (e.g., using negative pressure).

Once a part such as the first part 134a is secured through the vacuum that was created 172, laser processing may begin. In this example of laser welding, a mating part such as the second part 134b may be moved 174 into a laser processing position. For example, a press such as the press 138 may move toward a fixture 104 such that the second part 134b engages with the first part 134a secured by the fixture 104. Thereafter, the parts 134 may be laser processed 176. Laser processing may include cutting, drilling, welding, or any other laser processing. After the parts 134 are laser processed 176, the vacuum may be released 178, which enables the processed parts 134 to be released from the system 100. This may be accomplished by, for example, shutting off the pump 120.

Figure 15:
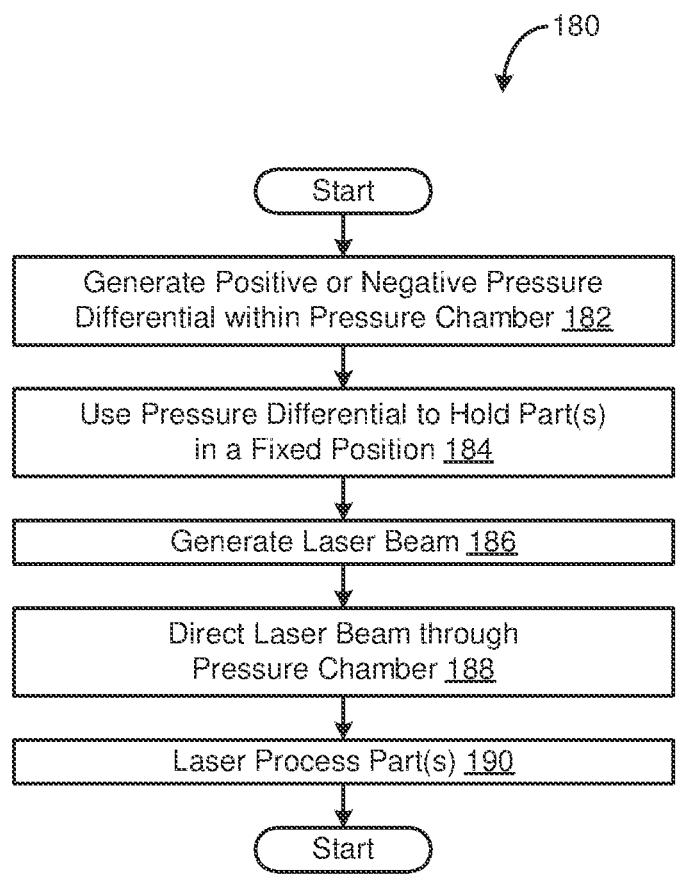
FIG. 15 is a block diagram of another embodiment of a method of laser processing one or more parts.

Referring to FIG. 15, a method for laser processing 180 may include generating 182 a positive or negative pressure within a pressure chamber 102. The positive or negative pressure may be used 184 to hold at least one part in a fixed position with respect to the pressure chamber 102. For example, a suction effect caused by a negative pressure within the pressure chamber 102 may be used 184 to hold at least one part 134 in a fixed position with respect to the pressure chamber 102. Thus, with the part(s) 134 properly secured in place, the laser beam 130 may be generated 186 and directed 188 at the part(s) 134 to conduct laser processing 190, such as welding, micromachining, or the like. During such directing 188, the laser beam 130 passes through the pressure chamber 102 while avoiding (e.g., the outer perimeter of) the fixture 104. For example, two opposing transparent walls or plates 108 may define the pressure chamber 102. Accordingly, the fixture 104 aids in securing a part in a fixed position without the components needed to secure the part to the pressure chamber 102 (e.g., the conduits, suction cups, etc.) interfering with the laser processing 190 of the part.

Variations and/or additions to the above embodiments are possible. For example, a pressure sensor of the pump 120 and/or a separate pressure sensor monitoring pressure within the pressure chamber 102 may be used to determine the presence of the part to be retained. For example, a change in pressure (e.g., a reduction in pressure) above a predefined amount may indicate the presence of the part.

In some implementations, the system 100 may be used for part dimensional assistance. For example, the system 100 may be used to pull or otherwise force a part into a shape, such as a flat shape. As mentioned briefly above, conduits 136 of different sizes may be used to provide different amounts of suction to different sections or portions of a part, which in turn may be used to pull different locations of the part to achieve such a purpose.

In addition to or instead of the vacuum pressure described above, positive pressure may be used to apply force to a part for laser processing, such as welding. For example, cylinders may be incorporated within or form the fixture 104 and apply pressure to certain sections of a part, regardless of whether a vacuum is applied to other sections of the part. Alternatively, or additionally, air pressure may be directly applied to the part through cups similar to the vacuum cups 162.

In the examples disclosed hereinabove, the pressure chamber 102 has been presented as a single pressure chamber. Other implementations are possible where multiple pressure chambers 102 are used. For example, a pressure chamber 102 could be subdivided by (e.g., metal) plates, where each subdivided pressure chamber 102 may be subject to different pressures by separate pumps 120 that access the different chambers 102 via different pressure ports 118. The pressures could be different positive and negative pressure values. Multiple, separate chambers 102 may also be used that are separately pressure controlled. In some implementations, the pressure chambers 102 may be in a stacked configuration.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation to encompass all such modifications and equivalent structures as is permitted under the law.

What is claimed is:

1. A system for laser processing, comprising:
   a plate assembly comprising a first plate, a second plate secured to the first plate, and a pressure chamber located between the first plate and the second plate, wherein:
      the plate assembly comprises one or more spacers and one or more fasteners;
      the one or more fasteners urge the first plate toward the second plate; and
      the one or more spacers are located between the first plate and the second plate and ensure that a gap of at least a selected distance is preserved between the first plate and the second plate;
   a connector extending into the pressure chamber and in fluid communication with the pressure chamber; and
   a fixture having a first end and a second end, wherein the first end is attached to the second plate of the plate assembly, the second end has a surface shaped to fit a part to be retained and laser processed, the surface has at least one opening, and the fixture has a conduit extending therethrough in fluid communication with the pressure chamber and the at least one opening.

2. The system of claim 1, wherein the first plate and the second plate are formed of transparent material.

3. The system of claim 2, comprising:
   a laser system positioned on a side of the plate assembly facing the first plate; and
   a pump connected in fluid communication with the pressure chamber.

4. The system of claim 3, wherein the laser system is configured to direct a laser beam through the first plate and the second plate outside of an outer perimeter of the fixture.

5. The system of claim 1, wherein the plate assembly comprises:
   a gasket compressed between the first plate and the second plate, the gasket cooperating with the first plate and the second plate to form the pressure chamber.

6. The system of claim 5, wherein the gasket encircles the pressure chamber.

7. The system of claim 1, wherein the part is a first part, and the system comprises:
   a press supporting a second part; and
   a controller configured to raise the second part adjacent to at least one surface of the first part such that laser processing the first part also laser processes the second part.

8. A method for laser processing, comprising:
   generating a positive or negative pressure within a pressure chamber located between by a first plate and a second plate secured to the first plate and forming a plate assembly, wherein generating the positive or negative pressure comprises using a connector extending into the pressure chamber and in fluid communication with the pressure chamber;
   using the positive or negative pressure to hold a part to be retained and laser processed in a fixed position with respect to the pressure chamber using a fixture having a first end and a second end, wherein the first end is attached to the second plate of the plate assembly, the second end has a surface shaped to fit the part, the surface has at least one opening, and the fixture has a conduit extending therethrough in fluid communication with the pressure chamber and the at least one opening; and
   directing a laser beam at the part through the pressure chamber without passing the laser beam through the fixture.

9. The method of claim 8, wherein:
   the first plate and the second plate are formed of transparent material; and
   a first end of the connector extending into the pressure chamber; and
   a second end of the connector is in fluid communication with a pump.

10. The method of claim 9, wherein the generating comprises generating a negative pressure within the pressure chamber.

11. The method of claim 10, wherein the using comprises using the negative pressure to hold by suction the part in the fixed position with respect to the pressure chamber.

12. The method of claim 10, wherein:
   the second end is shaped to register the part thereagainst.

13. The method of claim 8, wherein:
   the second plate comprises an aperture extending therethrough; and
   the conduit of the fixture is in fluid communication with the pressure chamber via the aperture.

14. The method of claim 8, wherein:
   the part is a first part;
   the fixture includes a first registration surface engaged with the first part;
   the fixture includes a second registration surface engaged with a second part such that the first part is at least partially surrounded by the second part;
   a mirror surrounds at least a portion of the fixture where the first part and the second part overlap; and
   the laser beam processes the first part and the second part after deflection from a laser source by the mirror.

* * * * *